2,994,674
CASTOR OIL-BASED URETHANE COATINGS

George O. Rudkin, Jr., Wilmington, and Joseph E. Wilson, Newark, Del., and Michael A. Dunn, Philadelphia, Pa., assignors to Atlas Powder Company, Wilmington, Del., a corporation of Delaware
No Drawing. Filed Aug. 7, 1959, Ser. No. 832,141
4 Claims. (Cl. 200—18)

This invention relates to urethane coating compositions based on modified castor oil and more particularly to such composition based on the alcoholysis products of castor oil and polyoxypropylene ethers of hexitols.

The low cost, ready availability and chemical reactivity of castor oil makes it a desirable base for the preparation of coating compositions and its reaction product with isocyanates has been proposed for such use.

It has been found in accordance with the present invention that coatings of substantially reduced drying time, increased hardness, higher tensile strength and improved resistance to solvents can be obtained by combining diisocyanates with the alcoholysis reaction products of castor oil and polyoxypropylene ethers of hexitols.

Aromatic diisocyanates such, for example as 2,4-tolylene diisocyanate, 2,6-tolylene diisocyanate and diphenyl methane diisocyanate are particularly suited for use in the compositions of the invention.

The alcoholysis products with which the diisocyanate is compounded in forming the coating compositions are the reaction products of from 0.35 to 0.75 molar proportions of polyoxypropylene ethers of hexitols containing from 6 to 30 oxypropylene groups per mol with one molar proportion of castor oil. Such alcoholysis products are prepared in known manner by heating the castor oil and polyoxypropylene ether, if desired in the presence of an alcoholyzing or ester-interchange catalyst until substantial reaction has occurred to yield a mixture of partial ricinoleic acid esters of glycerol and of the hexitol polyoxypropylene ether.

Polyoxypropylene ethers of hexitols suitable for the preparation of the described alcoholysis products are known in the art and may readily be prepared by the direct addition of propylene oxide, in the desired molecular proportion, to a hexitol at elevated temperature and pressure in known manner. To facilitate manipulation of the hexitol it is often convenient to use it in the form of a syrup containing a minor proportion, up to 15% by weight, of water. When employed in this form the resulting ether contains, in addition to the hexitol ether, some polypropylene glycol. The presence of the glycol is not deleterious in the proportions so introduced and the mixture may be used directly in the alcoholysis reaction. Because of its low cost and ready availability sorbitol is the preferred hexitol for use in forming the polyoxypropylene ethers to be employed.

The alcoholysis product prepared as described above is cooled and admixed, preferably in the presence of a nonreactive solvent, with an aromatic diisocyanate. The proportion of diisocyanate to alcoholysis product should be chosen to furnish at least one equivalent of isocyanate radical for each hydroxyl group of the alcoholysis product and preferably to furnish at least a 10% excess thereof. The proportion of diisocyanate may be as large as to furnish 3 isocyanate groups per hydroxyl group of the alcoholysis product although it is generally preferred to keep the NCO/OH ratio below a value of about 2/1.

An exothermic reaction between the diisocyanate and alcoholysis product occurs and the temperature is prevented from exceeding about 60° C. by appropriate means until the reaction has subsided.

Compositions so prepared will have a shelf life of several months if moisture is excluded. They may be diluted as desired, with solvents which are nonreactive to isocyanate groups, for application by conventional brushing, spraying or dipping techniques. Films applied from such solutions may be cured by baking.

Coating compositions which cure at room temperature may be obtained by adding to a solution prepared as described above, shortly before its application, a conventional catalyst for isocyanate condensation. Tertiary amines such, for example, as methyl diethanol amine are particularly suitable for this purpose.

The following example in which all of the recited parts are by weight is illustrative of the preparation of a coating composition in accordance with the invention:

An alcoholysis product is prepared by heating together, first for 1 hour at 190–210° C. and then for 2 hours at 240–260° C. a mixture composed of 1053 parts of castor oil, 475 parts of the polyoxypropylene ether of sorbitol containing 10 oxypropylene groups per mol and 15 parts of calcium naphthenate as alcoholyzing catalyst.

1000 parts of the resulting alcoholysis product, after cooling to below 50° C. are then added, with thorough agitation and under an atmosphere of dry nitrogen, to a solution of 570 parts of tolylene diisocyanate in 1570 parts of toluene. The temperature is prevented from exceeding 60° C. by supplying external cooling if necessary and is held at 50° to 60° for an hour or two. The product is then cooled and filtered and is ready for use as a baking lacquer. It has a shelf life of several months and, when applied in a thin film to a surface to be protected, may be cured by baking for approximately 45 minutes at 300° F. The coating formed is hard, abrasion resistant and solvent resistant.

The foregoing formula may be converted to a composition yielding coatings curable at room temperature in 72 hours by the incorporation of 86 parts of methyl diethanol amine. Coatings so-formed and cured are, like the baked coatings, hard, abrasion-resistant and solvent-resistant.

What is claimed is:

1. A coating composition comprising the reaction product of an aromatic diisocyanate and the alcoholysis product of castor oil with a polyoxypropylene ether of a hexitol.

2. A coating composition comprising the reaction product of an aromatic diisocyanate and the alcoholysis product of one molar proportion of castor oil with from 0.35 to 0.75 molar proportions of a polyoxypropylene ether of a hexitol containing from 6 to 30 oxypropylene groups per mol.

3. A coating composition as in claim 2 wherein the proportions of said diisocyanate to said alcoholysis product are so chosen as to furnish from 1.0 to 3.0 isocyanate radicals per hydroxyl group.

4. A coating composition as in claim 2 wherein the proportions of said diisocyanate to said alcoholysis product are so chosen as to furnish from about 1.1 to about 2.0 isocyanate radicals per hydroxyl group.

References Cited in the file of this patent
UNITED STATES PATENTS

| | | |
|---|---|---|
| 2,833,730 | Barthel | May 6, 1958 |
| 2,864,780 | Katz et al. | Dec. 16, 1958 |
| 2,867,278 | Mallory et al. | Jan. 6, 1959 |
| 2,877,193 | Roussel | Mar. 10, 1959 |